United States Patent
David et al.

(10) Patent No.: US 8,099,047 B2
(45) Date of Patent: Jan. 17, 2012

(54) METHOD FOR CONTROLLING THE SLEEP MODE ON A MOBILE TERMINAL, CORRESPONDING MOBILE TERMINAL, AND CORRESPONDING RADIO ACCESS NODE

(75) Inventors: Klaus David, Warburg (DE); Matthias Hildebrand, Kassel (DE); Gabriel Cristache, München (DE); Rolf Sigle, Remshalden (DE); José Diaz Cervera, Valencia (ES)

(73) Assignee: Alcatel Lucent, Paris (FR)

( * ) Notice: Subject to any disclaimer, the term of this patent is extended or adjusted under 35 U.S.C. 154(b) by 1173 days.

(21) Appl. No.: 11/080,557

(22) Filed: Mar. 16, 2005

(65) Prior Publication Data
US 2005/0208966 A1 Sep. 22, 2005

(30) Foreign Application Priority Data
Mar. 17, 2004 (EP) .................................. 04290730

(51) Int. Cl.
*H04B 7/00* (2006.01)
(52) U.S. Cl. .................. 455/41.2; 455/553.1; 455/574; 455/343.1; 455/561; 455/552.1; 455/435.1; 370/311; 370/328; 370/467
(58) Field of Classification Search .............. 455/41.2, 455/553.1, 574, 343.1, 561, 552.1, 435.1; 370/467, 311, 328
See application file for complete search history.

(56) References Cited

U.S. PATENT DOCUMENTS

| | | | |
|---|---|---|---|
| 5,910,944 A * | 6/1999 | Callicotte et al. ............ 370/311 |
| 6,175,557 B1 * | 1/2001 | Diachina et al. ............. 370/313 |
| 6,334,062 B1 * | 12/2001 | Cashman ................... 455/553.1 |
| 6,438,375 B1 * | 8/2002 | Muller ........................ 455/435.3 |
| 6,449,494 B1 * | 9/2002 | Cashman ................... 455/553.1 |
| 6,463,271 B1 * | 10/2002 | Schroeder et al. ........... 455/561 |
| 6,567,855 B1 | 5/2003 | Tubbs et al. |
| 6,788,656 B1 * | 9/2004 | Smolentzov et al. ........ 370/328 |
| 6,853,851 B1 * | 2/2005 | Rautiola et al. ............ 455/553.1 |
| 6,904,055 B2 * | 6/2005 | Pichna et al. ................ 370/467 |
| 6,950,645 B1 * | 9/2005 | Kammer et al. ........... 455/343.1 |
| 6,959,204 B1 * | 10/2005 | Townend et al. .............. 455/557 |
| 7,016,372 B2 * | 3/2006 | Haartsen ....................... 370/461 |
| 7,020,438 B2 * | 3/2006 | Sinivaara et al. ............ 455/41.2 |
| 7,020,439 B2 * | 3/2006 | Sinivaara et al. ............ 455/41.2 |
| 7,020,472 B2 * | 3/2006 | Schmidt ....................... 455/450 |
| 7,035,234 B2 * | 4/2006 | Toskala et al. ............... 370/329 |
| 7,058,040 B2 * | 6/2006 | Schmidt ....................... 370/337 |
| 7,092,716 B2 * | 8/2006 | Nizri et al. .................... 455/448 |
| 7,136,368 B2 * | 11/2006 | Inoue ............................ 370/338 |
| 7,142,882 B2 * | 11/2006 | Schmidt ..................... 455/552.1 |
| 7,180,876 B1 * | 2/2007 | Henry et al. .................. 370/329 |
| 7,224,677 B2 * | 5/2007 | Krishnamurthi et al. ..... 370/331 |
| 7,230,933 B2 * | 6/2007 | Bahl et al. .................... 370/311 |
| 7,266,389 B2 * | 9/2007 | Karaoguz et al. .......... 455/556.1 |

(Continued)

FOREIGN PATENT DOCUMENTS
DE 198 33 777 A1 2/2000
(Continued)

*Primary Examiner* — Marceau Milord
(74) *Attorney, Agent, or Firm* — Sughrue & Mion, PLLC

(57) ABSTRACT

The present invention relates to a method for controlling sleep mode in a terminal comprising at least two network interfaces.

According to the present invention, the method comprises the steps of:
  Switching off one of the two interfaces;
  Activating the switched off interface for a predefined time window upon reception of a predefined signaling message on the other interface.

15 Claims, 2 Drawing Sheets

U.S. PATENT DOCUMENTS

| | | | |
|---|---|---|---|
| 7,277,417 B2 * | 10/2007 | Palm et al. | 370/338 |
| 7,299,009 B2 * | 11/2007 | Hussmann | 455/41.2 |
| 7,321,755 B2 * | 1/2008 | Hulvey | 455/343.1 |
| 7,336,602 B2 | 2/2008 | Silvester | 370/216 |
| 7,379,447 B2 * | 5/2008 | Dunagan et al. | 370/350 |
| 7,421,291 B2 * | 9/2008 | Karaoguz et al. | 455/574 |
| 7,471,626 B2 * | 12/2008 | Naghian et al. | 370/229 |
| 7,471,655 B2 * | 12/2008 | Gallagher et al. | 370/329 |
| 7,496,360 B2 * | 2/2009 | Sindhwani et al. | 455/422.1 |
| 2002/0080755 A1 * | 6/2002 | Tasman et al. | 370/338 |
| 2003/0112766 A1 * | 6/2003 | Riedel et al. | 370/252 |

FOREIGN PATENT DOCUMENTS

EP     1 359 779 A1    11/2003

\* cited by examiner

METHOD FOR CONTROLLING THE SLEEP MODE ON A MOBILE TERMINAL, CORRESPONDING MOBILE TERMINAL, AND CORRESPONDING RADIO ACCESS NODE

BACKGROUND OF THE INVENTION

The invention is based on a priority application EP04290730.3 which is hereby incorporated by reference.

The present invention relates to a method for controlling sleep mode in a dual mode terminal comprising an ad-hoc interface and a cellular network interface.

Ad-hoc networks are becoming more and more successful in the marketplace as indicated by the increasing usage of Bluetooth and WLAN networks. This success is due to several reasons, including their lack of infrastructure requirements as well as their suitability for several application scenarios like the communication between laptops and/or handheld devices.

It is also possible to use ad-hoc networks as an extension of the cellular air-interface, leading to improvements in cellular capacity as well as coverage. Additionally Load balancing between different cells can be provided by relaying individual calls to adjacent cells that otherwise could not be reached.

As a consequence, the integration of cellular (GSM/GPRS and UMTS, Beyond 3G, 4G) and ad-hoc (Bluetooth, WLAN, 4G) networks must be appropriately managed.

FIG. 1 describes a scenario for the integration of ad-hoc and cellular mobile networks. In this scenario, either one direct cellular link (1) or two links (2) and (3) can be used to connect a mobile terminal to the cellular radio communication network. Link (2) connects the mobile terminal to a relay and link (3) connects the relay to the cellular radio communication network.

For working, this scenario requires following information:
which potential relays are available?
what is the quality or link performance of each link (cellular as well as ad-hoc links) that potentially could be used?

The answers to these questions are required to make a sound decision between the different alternatives including the direct cellular link An issue to solve in such a dual mode mobile terminal comprising an ad-hoc interface and a cellular network interface is the power consumption. In ad-hoc as well as in cellular technologies a sleep mode is provided at the mobile terminal to save battery power. The mobile terminal wakes up periodically from the sleep mode in order to listen to incoming calls. The less often the terminals need to wake-up the longer the sleep mode could be maintained and the longer the battery power would suffice. Hence, there is a trade-off between idle mode power consumption and reaction time.

Since battery power is especially very scarce in mobile terminals communicating over ad-hoc networks, elaborated sleep modes have been designed to save battery power (see background at the end of this text). Depending on the exact type, situation and configuration of sleep mode, the waking up can take some few 100 ms up to several seconds.

In the following, conventional sleep mode and wake-up mechanisms are described for cellular radio communication networks as well as for ad-hoc networks.

In cellular networks (example UMTS), the Paging Channel (PCH) is operated together with the Paging Indicator Channel (PICH) to provide terminals with sleep mode operations. The Paging Indicators (PI) occur once per slot on the corresponding physical channel, the PICH. Depending on the paging indicator repetition ratio, there can be 18, 36, 72 or 144 Paging Indicators per PICH frame. How often a terminal needs to listen to the PICH is parameterized, and the exact moment depends on the system frame number (SFN). For detection of the PICH the terminal needs to obtain the phase reference from the Common Pilot Channel (CPICH).

A terminal, once registered to a network, has been allocated to a paging group. For the paging group there are Paging Indicators (PI), which appear periodically on the PICH when there are messages for any of the terminals belonging to the paging group. Once a PI has been detected, the terminal decodes the next PCH frame to see whether there was a paging message intended for it.

The less often the PI appear, the less often the terminal needs to wake-up from sleep mode and the longer the battery life becomes. The trade-off is the reaction time.

Within the IEEE 802.11 standard (WLAN based ad-hoc networks) the general idea is that all stations in power save mode should be synchronized to wake-up in the same time. At this time there starts a window in which the sender announces the buffered frames for the receiver. A station that receives such an announcement frame stays awake until the frame is delivered.

In infrastructure mode, the access point is able to store packets for stations in doze state and to synchronize all mobile stations. In ad-hoc mode, the packet store and timing synchronization has to be done in a distributed manner. Power saving in IEEE 802.11 consists of a Timing Synchronization Function (TSF) and the actual power saving mechanism.

In the case of TSF for infrastructure mode, the access point is generating beacons, which contain a time stamp. Stations adjust their local timers to that time stamp. Beacons are sent periodically in beacon periods. Doze stations have to wake-up once in one beacon interval. If the channel is in use after the beacon interval the access point has to defer its transmission until the channel is free again.

In ad-hoc mode the timers adjust in a distributed way: every station is generating a beacon. After the beacon interval all stations compete for transmission of the beacon using the standard back-off algorithm. The first station wins the competition and all other have to cancel their beacon transmission and to adjust their local timers to the time stamp of the winning beacon. The stations should wake-up at the beginning of each beacon interval. The period in which one station is awake consists of a deferral delay (if the channel is in use after the previous beacon interval), a random time interval till the beacon is sent and another random time interval after the beacon is sent.

The power management is based on the distributed scheme as it is used for TSF. Packets for a station in doze state have to be buffered by the sender until the end of the beacon interval. The station in doze mode is first announced during the period when all the stations are awake. The announcement is done via an ad-hoc traffic indication message (ATIM), which is transmitted in a special interval (the ATIM window) directly after the beacon. A station in the power save mode should listen for these announcements to determine if it needs to remain in the doze state.

In Bluetooth based ad-hoc networks, there are synchronized sleep mode procedures, which can be only applied after the piconet has been established, and unsynchronized sleep mode procedures.

In the case of synchronized procedures there is little uncertainty in time and frequency. The slave can be "parked" by the master, similar to how cellular terminals are locked to their radio access node. Therefore for these procedures the sleep time can be longer.

In the case of unsynchronized procedures the unit that wants to connect has to solve the time-frequency uncertainty: it does not know when the idle unit will wake-up and on which frequency. For this, three mechanisms have been defined: inquiry, scan and page, which will be shortly explained in the next paragraphs.

In order to determine the page message and the wake-up sequence, the paging unit must know the identity of the unit in idle mode. If this information is not known, the paging unit may broadcast an inquiry message that induces recipients to return their identity and clock information.

To further describe paging and scan procedures it is assumed that the paging unit knows the identity of the unit in idle mode, but it does not know the clock information.

The unit in idle mode periodically wakes-up to listen for paging messages containing its identity. Every time the unit wakes-up it scans a different hop carrier (for interference reasons). When a Bluetooth unit wakes up to scan, it opens its sliding correlator, which is matched to the access code derived from its own identity. The scan window is 10 ms and the wake-up sequence is 32 hops in length and cyclic. The phase of the sequence is derived from the native clock of the unit.

If the paging unit knows the identity of the unit in sleep mode, then it knows the wake-up sequence and also generates the access code, which serves as paging message. The paging unit transmits the access code repeatedly at different frequencies every 1.25 ms; the paging unit transmits two access codes and listens twice for an answer. Consecutive access codes are transmitted on different hops selected from the wake-up sequence. In a 10 ms period 16 different hop frequencies are visited, which represent half of the wake-up sequence. The paging unit transmits the access code on these 16 frequencies cyclically for the duration of the sleep period of the idle unit.

If the idle unit wakes-up in any of these 16 frequencies, it will receive the access code. However, since the paging unit does not know the phase the idle unit is using, the idle unit can equally well wake-up in any of the 16 remaining frequencies from the 32-hop wake-up sequence. Therefore, if the paging unit does not receive a response after a time corresponding to the sleep time, it will transmit the access code repeatedly on the hop carriers from the remaining half of the sequence. The maximum access delay therefore amounts to twice the sleep time.

If the paging unit knows the clock of the idle unit then the average response time is reduced to half of the sleep time.

A mobile terminal comprising a first cellular interface and a second ad-hoc interface should wake-up periodically on the cellular as well as on the ad-hoc air interface.

A drawback is that the power consumption is heavily increased (roughly doubled) compared to a single air interface, leading to shorter battery life in sleep mode.

A particular object of the present invention is to provide a method for maintaining an efficient sleep mode for mobile terminals supporting two air interfaces: cellular and ad-hoc.

Another object of the invention is to provide a mobile terminal as well as a radio access node of the cellular network for performing this method.

SUMMARY OF THE INVENTION

These objects, and others that appear below, are achieved by a method for controlling sleep mode in a terminal comprising at least two network interfaces, a radio access node of a cellular radio communication network and a mobile terminal.

According to the present invention, the method consists in waking up one switched off air interface by means of signaling on the other interface.

An example would be to completely switch off the ad-hoc air interface in order to save battery power and to switch it on after an appropriate message was received on the cellular air interface.

The method according to the present invention presents the advantage to provide a reduction of power consumption, hence increase of possible stand-by time for the mobile terminal. This advantage is achieved by completely switching off the ad-hoc air interface during sleep mode. The ad-hoc air interface is switched on only after an appropriate request received by the cellular air interface of the mobile terminal. Battery consumption for a dual terminal in sleep mode is as a consequence similar to that of a cellular terminal having no ad-hoc interface The method according to the present invention further presents the advantage to improve the reaction time for service requests. This advantage is based on the assumption that for most situations the reaction time of the system using the cellular air interface would be faster than the reaction time using the ad-hoc air interface would be. This may become particularly significant if the two devices in question did not have a previous connection on the ad-hoc interface.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

In the following the invention will be described with reference to a dual mode terminal having a ad-hoc interface and a cellular interface. It will nevertheless be clear for a person skilled in the art that the invention may apply to a multi mode terminal having different ad-hoc air interface to different types of ad-hoc networks.

Figure 1:
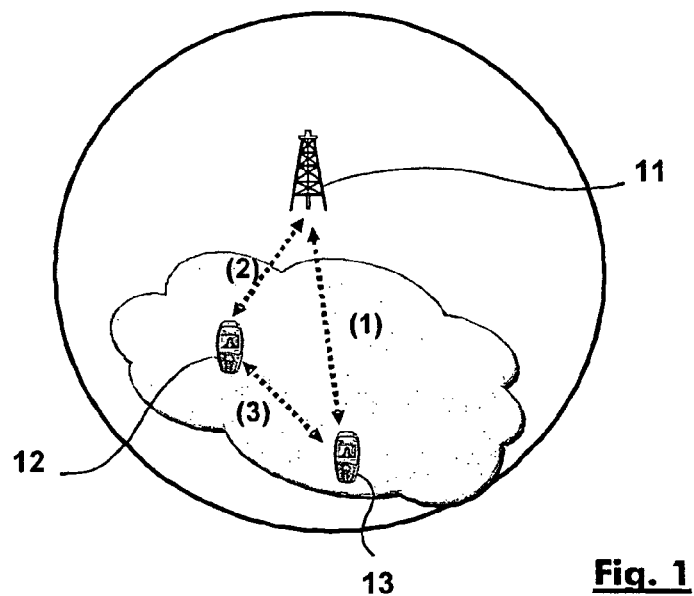
FIG. 1 shows a system where the present invention can be implemented.

FIG. 1 shows a system where the present invention can be implemented. The system comprises a radio access node (e.g. RNC, BSC) 11 belonging to a cellular communication network, a mobile relay 12 and a mobile terminal 13.

Mobile terminal 13 comprises two radio interfaces, a first one, herein called cellular radio interface, to communicate with radio access node 11 and a second one, herein called ad-hoc radio interface, to communicate with mobile relay 12.

Cellular radio interface can be a UMTS or a GSM interface while ad-hoc radio interface can be a Bluetooth, wireless LAN (802.11a or 802.11b, 803.11g) interface or an interface for any type of short range wireless access.

According to the present invention, terminal 13 can access to the cellular radio communication network either directly on path (1) from its cellular radio interface through radio access node 11 or indirectly on paths (2) and (3) from its ad-hoc interface through mobile relay 12 and through radio access node 11.

According to the present invention, mobile terminal 13 comprises means for switching off one of its two interfaces in order to save battery power and to activate the switched off interface upon reception of a predefined signaling message over the other interface.

As a consequence, the switched off interface does not require any energy during the time its is switched off and needs only to wake up when it is triggered by a signaling message received on the other interface which works identically to prior art methods having known sleep mode and wake up mechanisms.

The switched off interface will have to wake up for a predetermined time duration only when it has been identified that data are destined to it. In prior art, on the contrary, each interface has to wake up periodically to listen if messages are destined to it before it either go back to the sleep mode if no message is available or it accepts these messages if available.

Figure 2:
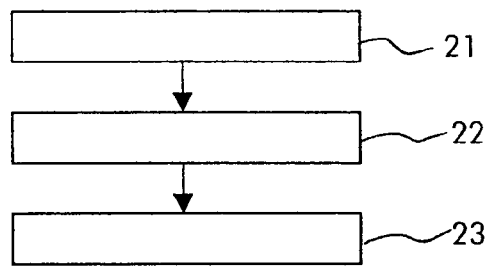
FIG. 2 shows an implementation of the method according to the invention.

FIG. 2 shows an implementation of the method according to the invention. The method according to the present invention comprises following steps:

Step 21 consists in switching off one of the two radio interfaces available at the mobile terminal.

Step 22 consists in monitoring at the non switched off radio interface if a predefined signaling message indicating that the switched off interface should wake up.

Step 23 consists in triggering the switched off radio interface upon identification of the above mentioned signaling message so that the switched off radio interface wakes up and accept data destined to it. The radio interface is activated for a certain time duration allowing it to receive the data destined to it. This time duration may be predetermined as system parameter or sent over signaling. After this time duration the radio interface will preferably be switched off again.

In a preferred embodiment of the present invention, the ad-hoc interface is switched off and the message indicating that data are available for the ad-hoc interface is transmitted to the cellular radio interface of the mobile terminal.

In another embodiment of the present invention, the cellular radio interface is switched off and a message indicating that data are to be received on the cellular radio interface is transmitted to the mobile terminal over the ad-hoc interface.

In a preferred embodiment of the present invention, the interface to switch off is determined according to traffic measurement on a case by case basis. Moreover in a further preferred embodiment the interface to switch off can be modified at regular time interval depending on traffic measurements on the two interfaces. Advantageously the interface on which the less traffic is received is switched off, the re-activation being performed upon reception of a predefined message on the other interface.

Figure 3:
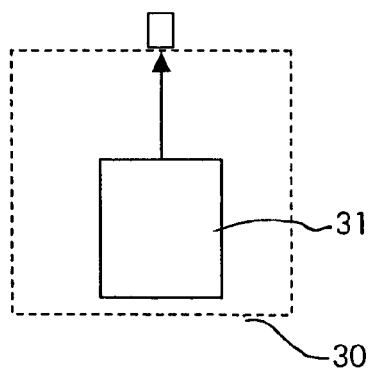
FIG. 3 shows an implementation of a radio access node of a cellular communication network according to the invention.

FIG. 3 shows an implementation of a access network node 30 of a cellular communication network according to the invention. Access network node (eg. RNC, BSC) comprises means 31 for sending a predefined signaling message to a dual mode terminal comprising a cellular network interface and an ad-hoc interface, said message comprising an indication to activate said ad-hoc air interface if said ad-hoc interface is currently switched off.

It will be clear that the functionality described for the access network node in case the ad-hoc interface is switched off could also be supported by the mobile relay if the cellular interface is switched off.

In a preferred embodiment of the present invention, the signaling message is sent over a cellular signaling channel.

Preferably the message should be added to the radio resource control protocol of the cellular interface. Alternatively, said signaling message may be implemented as an extension to an already existing signaling message.

Figure 4:
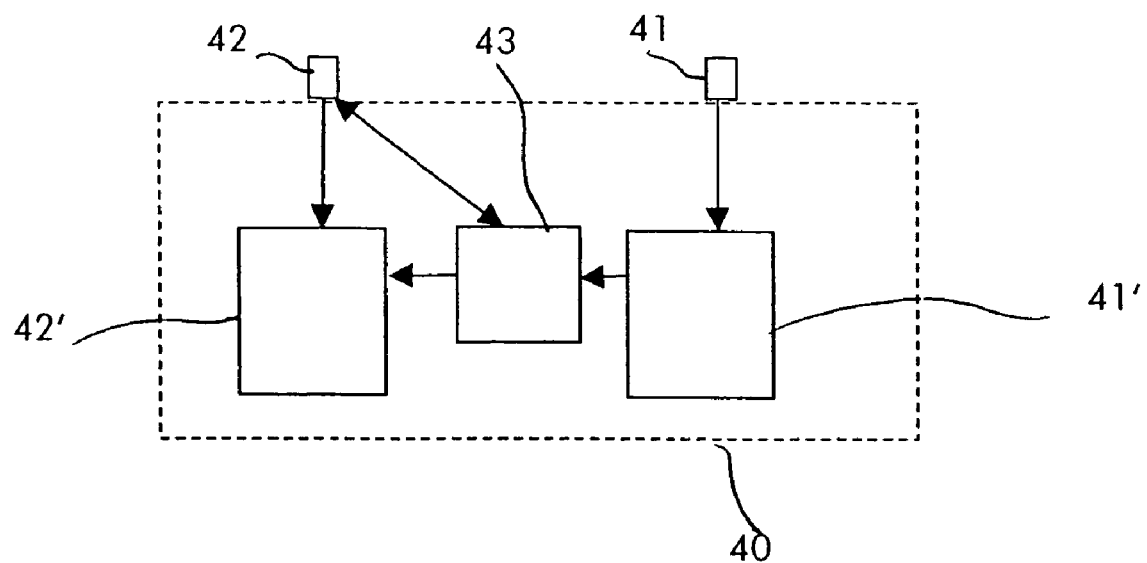
FIG. 4 shows an implementation of a mobile terminal according to the invention.

FIG. 4 shows an implementation of a mobile terminal according to the invention. Mobile terminal 40 comprises an ad-hoc radio interface 41 associated to means 41' for processing data received on the ad-hoc interface 41, a cellular radio interface 42 associated to means 42' for processing data received on cellular interface 42. Mobile terminal 40 further comprises means 43 for controlling sleep mode on at least one of said two interfaces.

Means 43 are adapted to switch off one of the two radio interfaces. Means 41' and 42' are adapted to detect a predefined message received on the non switched off radio interface 42, 41 indicating that data are available for reception on the switched off interface 41, 42. Means 41', 42' are adapted to forward the predefined message to means 43. Means 43 are adapted to activate the switched off interface upon reception of said predefined message.

In a preferred embodiment of the present invention the ad-hoc interface is switched off and the message indicating that data are available for the ad-hoc interface is transmitted to the cellular radio interface of the radio terminal.

In another embodiment of the present invention the cellular radio interface is switched off and a message indicating that data are to be received on the cellular radio interface is transmitted to the mobile terminal over the ad-hoc interface.

It will be clear for a person skilled in the art that the embodiment described in the present specifications are not to be seen restrictively. For example this invention may be applicable for multi-mode terminals having two ad-hoc interface of different types.

The invention claimed is:

1. Method for controlling sleep mode in a terminal comprising at least two wireless interfaces to different wireless networks, said method comprising the steps of:
   powering off one of the two wireless interfaces;
   activating said powered off wireless interface for a predefined time window upon reception of a predefined signaling message via a radio channel on said other wireless interface, the predefined signaling message indicating that data is to be sent to the wireless interface to be activated.

2. Method according to claim 1, wherein said terminal is a dual mode terminal comprising an ad-hoc interface and a cellular network interface.

3. Method according to claim 1, wherein said terminal is a multimode terminal having two ad-hoc interfaces of different type.

4. Method according to claim 2, wherein said cellular interface is switched off and activated upon reception of a signaling message over said ad-hoc interface.

5. Method according to claim 2 or 3, wherein said ad-hoc interface belong to the group of Bluetooth interface, WLAN interface.

6. Method according to claim 2, wherein said predefined signaling message is part of the cellular network radio resource control protocol sent on cellular signaling channels channel.

7. Method according to claim 2, wherein said ad-hoc interface is switched off and activated upon reception of a signaling message over said cellular interface.

8. The method according to claim 1, the method further comprising the step of:

monitoring at the non switched off interface for a predefined signaling message indicating that the switched off interface should wake up.

9. The method according to claim 1, wherein the interface to be switched off is determined according to traffic measurement on the two interfaces.

10. The method according to claim 1, wherein the interface on which there is less traffic is switched off.

11. The method according to claim 1, wherein a time duration for the predefined time window is predetermined as a system parameter.

12. The method according to claim 1, wherein a time duration for the predefined time window is sent over signaling.

13. Access network node of a cellular communication network comprising means for sending a predefined signaling message via a radio channel to a dual mode terminal comprising a cellular network interface and an ad-hoc wireless interface, said message comprising an indication to activate said ad-hoc wireless interface for a predefined time window if said ad-hoc wireless interface is currently powered off and if data is to be sent to said ad-hoc wireless interface to be activated.

14. Dual mode terminal comprising at least two wireless interfaces to different wireless networks, said terminal comprising means for controlling sleep mode on at least one of said two wireless interfaces, said dual mode terminal being wherein further comprises:
means for powering off one of the two wireless interfaces;
means for activating said powered off wireless interface for a predefined time window upon reception of a predefined signaling message via a radio channel on the other wireless interface indicating that data is to be sent to the wireless interface to be activated.

15. Access network node of a cellular communication network comprising means for sending a predefined signaling message to a dual mode terminal via a radio channel comprising a cellular network interface and an ad-hoc wireless interface, said message comprising an indication to activate said cellular air interface for a predefined time window if said cellular interface is currently powered off and if data is to be sent to said cellular interface to be activated.

* * * * *